US012676704B2

(12) United States Patent (10) Patent No.: US 12,676,704 B2
Khoshnevisan et al. (45) Date of Patent: Jul. 7, 2026

(54) BETA OFFSET AND MAXIMUM CODE RATE FOR TWO PART HYBRID AUTOMATIC REPEAT REQUEST ACKNOWLEDGEMENT (HARQ-ACK)

(71) Applicant: QUALCOMM Incorporated, San Diego, CA (US)

(72) Inventors: Mostafa Khoshnevisan, San Diego, CA (US); Yi Huang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 18/528,329

(22) Filed: Dec. 4, 2023

(65) Prior Publication Data

US 2025/0184048 A1 Jun. 5, 2025

(51) Int. Cl.
H04L 1/1867 (2023.01)
H04L 1/1812 (2023.01)

(52) U.S. Cl.
CPC .......... H04L 1/1893 (2013.01); H04L 1/1812 (2013.01)

(58) Field of Classification Search
CPC ... H04L 1/1893; H04L 1/1861; H04L 1/1812; H04L 1/1854
See application file for complete search history.

(56) References Cited

U.S. PATENT DOCUMENTS

| | | | | |
|---|---|---|---|---|
| 12,035,314 B2 * | 7/2024 | Li | .......... | H04L 5/0007 |
| 12,075,425 B2 * | 8/2024 | Bang | .......... | H04L 1/0026 |
| 2022/0377765 A1 * | 11/2022 | Zhang | .......... | H04L 5/0046 |
| 2023/0067736 A1 * | 3/2023 | Yang | .......... | H04W 72/12 |
| 2023/0318748 A1 * | 10/2023 | Yin | .......... | H04L 1/1854 |
| | | | | 370/329 |
| 2023/0412324 A1 * | 12/2023 | Bhamri | .......... | H04L 1/1854 |
| 2024/0032031 A1 * | 1/2024 | Yi | .......... | H04W 72/1273 |
| 2025/0344211 A1 * | 11/2025 | Zhang | .......... | H04L 1/1861 |

* cited by examiner

*Primary Examiner* — Congvan Tran

(74) *Attorney, Agent, or Firm* — QUALCOMM Incorporated

(57) ABSTRACT

A method for wireless communication at a user equipment (UE) includes forming a first hybrid automatic repeat request acknowledgement (HARQ-ACK) part and a second HARQ-ACK part associated with a HARQ-ACK payload. The HARQ-ACK payload including HARQ feedback for each one of a group of downlink transmissions received from a network node. A size of the second HARQ-ACK part is a function of the first HARQ-ACK part. The method also includes separately encoding the first HARQ-ACK part and the second HARQ-ACK part. The method further includes multiplexing the encoded first HARQ-ACK part in accordance with a first beta offset value and the encoded second HARQ-ACK part in accordance with a second beta offset value. The method also includes transmitting, to the network node, the multiplexed first HARQ-ACK part and second HARQ-ACK part.

30 Claims, 7 Drawing Sheets

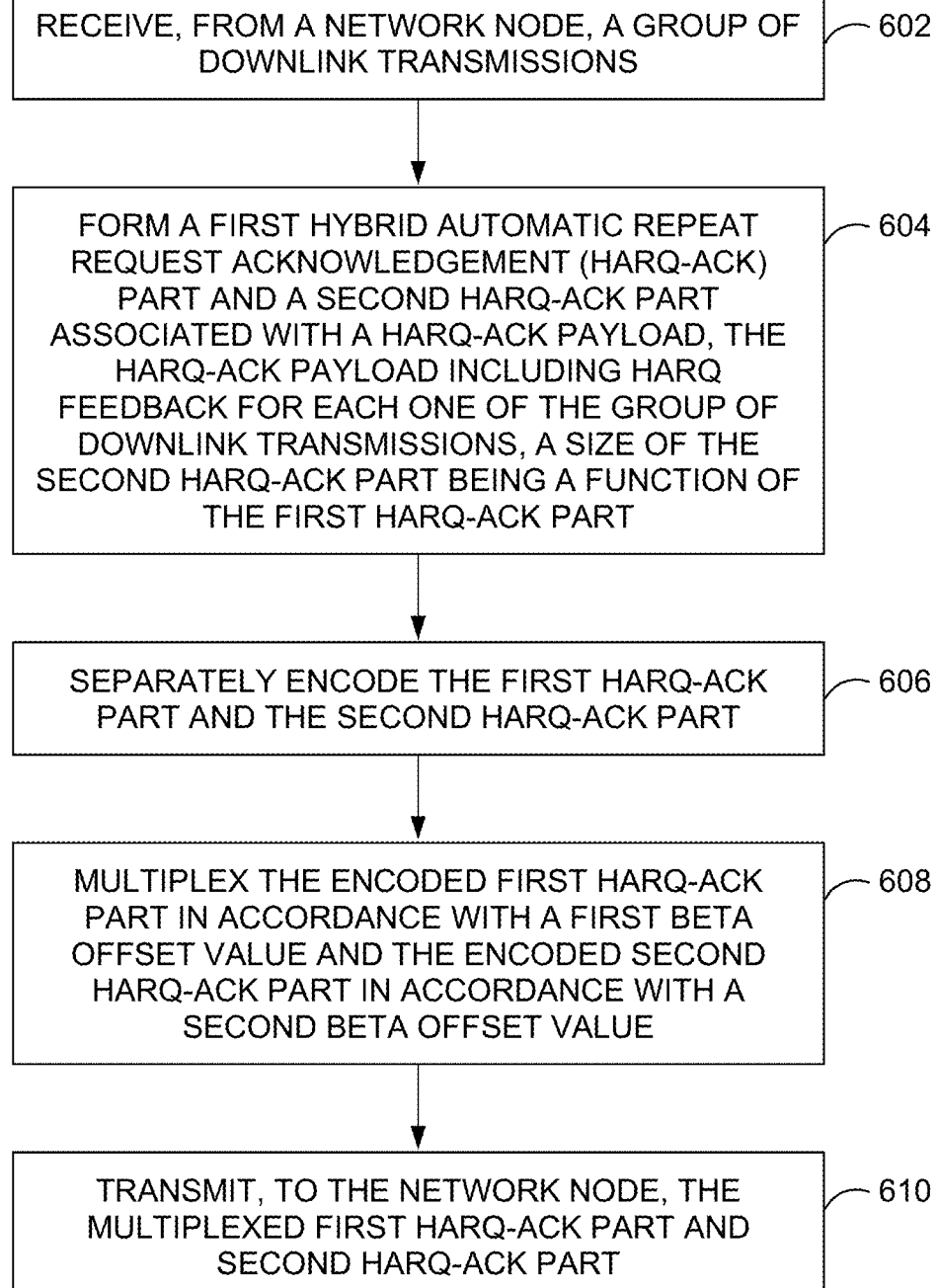

600

RECEIVE, FROM A NETWORK NODE, A GROUP OF DOWNLINK TRANSMISSIONS — 602

FORM A FIRST HYBRID AUTOMATIC REPEAT REQUEST ACKNOWLEDGEMENT (HARQ-ACK) PART AND A SECOND HARQ-ACK PART ASSOCIATED WITH A HARQ-ACK PAYLOAD, THE HARQ-ACK PAYLOAD INCLUDING HARQ FEEDBACK FOR EACH ONE OF THE GROUP OF DOWNLINK TRANSMISSIONS, A SIZE OF THE SECOND HARQ-ACK PART BEING A FUNCTION OF THE FIRST HARQ-ACK PART — 604

SEPARATELY ENCODE THE FIRST HARQ-ACK PART AND THE SECOND HARQ-ACK PART — 606

MULTIPLEX THE ENCODED FIRST HARQ-ACK PART IN ACCORDANCE WITH A FIRST BETA OFFSET VALUE AND THE ENCODED SECOND HARQ-ACK PART IN ACCORDANCE WITH A SECOND BETA OFFSET VALUE — 608

TRANSMIT, TO THE NETWORK NODE, THE MULTIPLEXED FIRST HARQ-ACK PART AND SECOND HARQ-ACK PART — 610

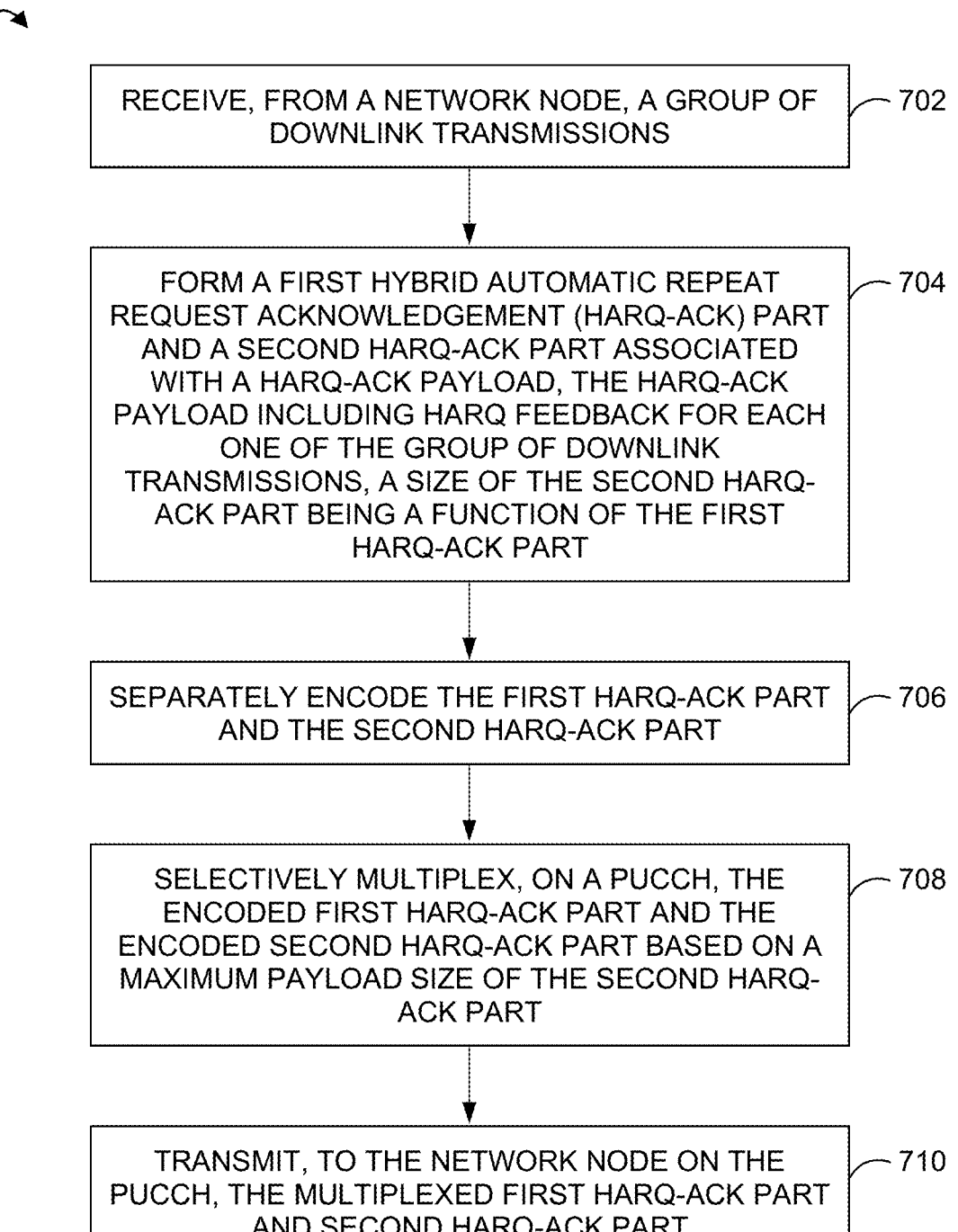

RECEIVE, FROM A NETWORK NODE, A GROUP OF DOWNLINK TRANSMISSIONS — 702

FORM A FIRST HYBRID AUTOMATIC REPEAT REQUEST ACKNOWLEDGEMENT (HARQ-ACK) PART AND A SECOND HARQ-ACK PART ASSOCIATED WITH A HARQ-ACK PAYLOAD, THE HARQ-ACK PAYLOAD INCLUDING HARQ FEEDBACK FOR EACH ONE OF THE GROUP OF DOWNLINK TRANSMISSIONS, A SIZE OF THE SECOND HARQ-ACK PART BEING A FUNCTION OF THE FIRST HARQ-ACK PART — 704

SEPARATELY ENCODE THE FIRST HARQ-ACK PART AND THE SECOND HARQ-ACK PART — 706

SELECTIVELY MULTIPLEX, ON A PUCCH, THE ENCODED FIRST HARQ-ACK PART AND THE ENCODED SECOND HARQ-ACK PART BASED ON A MAXIMUM PAYLOAD SIZE OF THE SECOND HARQ-ACK PART — 708

TRANSMIT, TO THE NETWORK NODE ON THE PUCCH, THE MULTIPLEXED FIRST HARQ-ACK PART AND SECOND HARQ-ACK PART — 710

*FIG. 7*

BETA OFFSET AND MAXIMUM CODE RATE FOR TWO PART HYBRID AUTOMATIC REPEAT REQUEST ACKNOWLEDGEMENT (HARQ-ACK)

FIELD OF THE DISCLOSURE

The present disclosure relates generally to hybrid automatic repeat request acknowledgement (HARQ-ACK) feedback during wireless communication, and more specifically to forming a beta offset and a maximum code rate for two HARQ-ACK parts associated with a HARQ-ACK payload.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method for wireless communication by a user equipment (UE) includes receiving, from a network node, a group of downlink transmissions. The method further includes forming a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. The method also includes separately encoding the first HARQ-ACK part and the second HARQ-ACK part. The method further includes multiplexing the encoded first HARQ-ACK part in accordance with a first beta offset value and the encoded second HARQ-ACK part in accordance with a second beta offset value. The method still further includes transmitting, to the network node, the multiplexed first HARQ-ACK part and second HARQ-ACK part.

Another aspect of the present disclosure is directed to an apparatus including means for receiving, from a network node, a group of downlink transmissions. The apparatus further includes means for forming a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. The apparatus further includes means for separately encoding the first HARQ-ACK part and the second HARQ-ACK part. The apparatus also includes means for multiplexing the encoded first HARQ-ACK part in accordance with a first beta offset value and the encoded second HARQ-ACK part in accordance with a second beta offset value. The apparatus still further includes means for transmitting, to the network node, the multiplexed first HARQ-ACK part and second HARQ-ACK part.

In another aspect of the present disclosure, a non-transitory computer-readable medium with non-transitory program code recorded thereon is disclosed. The program code is executed by a processor and includes program code to receive, from a network node, a group of downlink transmissions. The program code further includes program code to form a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. The program code also includes program code to separately encode the first HARQ-ACK part and the second HARQ-ACK part. The program code further includes program code to multiplex the encoded first HARQ-ACK part in accordance with a first beta offset value and the encoded second HARQ-ACK part in accordance with a second beta offset value. The program code still further includes program code to transmit, to the network node, the multiplexed first HARQ-ACK part and second HARQ-ACK part.

Another aspect of the present disclosure is directed to an apparatus one or more processors, and one or more memories coupled with the one or more processors and storing instructions operable, when executed by the one or more processors, to receive, from a network node, a group of downlink transmissions. Execution of the instructions further cause the apparatus to form a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. Execution of the instructions also cause the apparatus to separately encode the first HARQ-ACK part and the second HARQ-ACK part. Execution of the instructions further cause the apparatus to multiplex the encoded first HARQ-ACK part in accordance with a first beta offset value and the encoded second HARQ-ACK part in accordance with a second beta offset value. Execution of the instructions still further cause the apparatus to transmit, to the network node, the multiplexed first HARQ-ACK part and second HARQ-ACK part.

In one aspect of the present disclosure, a method for wireless communication by a UE includes receiving, from a network node, a group of downlink transmissions. The method still further includes forming a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. The method also includes separately encoding the first HARQ-ACK part and the second HARQ-ACK part. The method further includes selectively multiplexing, on a PUCCH, the encoded first HARQ-ACK part and the encoded second HARQ-ACK part based on a maximum payload size of the second HARQ-ACK part. The method still further includes transmitting, to the network node on the PUCCH, the multiplexed first HARQ-ACK part and second HARQ-ACK part.

Another aspect of the present disclosure is directed to an apparatus including means for receiving, from a network node, a group of downlink transmissions. The apparatus further includes means for forming a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. The apparatus also includes means for separately encoding the first HARQ-ACK part and the second HARQ-ACK part. The apparatus further includes means for selectively multiplexing, on a PUCCH, the encoded first HARQ-ACK part and the encoded second HARQ-ACK part based on a maximum payload size of the second HARQ-ACK part. The apparatus still further includes means for transmitting, to the network node on the PUCCH, the multiplexed first HARQ-ACK part and second HARQ-ACK part.

In another aspect of the present disclosure, a non-transitory computer-readable medium with non-transitory program code recorded thereon is disclosed. The program code is executed by a processor and includes program code to receive, from a network node, a group of downlink transmissions. The program code also includes program code to form a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. The program code also includes program code to separately encode the first HARQ-ACK part and the second HARQ-ACK part. The program code further includes program code to selectively multiplex, on a PUCCH, the encoded first HARQ-ACK part and the encoded second HARQ-ACK part based on a maximum payload size of the second HARQ-ACK part. The program code still further includes program code to transmit, to the network node on the PUCCH, the multiplexed first HARQ-ACK part and second HARQ-ACK part.

Another aspect of the present disclosure is directed to an apparatus one or more processors, and one or more memories coupled with the one or more processors and storing instructions operable, when executed by the one or more processors, to receive, from a network node, a group of downlink transmissions. Execution of the instructions further cause the apparatus to form a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. Execution of the instructions also cause the apparatus to separately encode the first HARQ-ACK part and the second HARQ-ACK part. Execution of the instructions further cause the apparatus to selectively multiplex, on a PUCCH, the encoded first HARQ-ACK part and the encoded second HARQ-ACK part based on a maximum payload size of the second HARQ-ACK part. Execution of the instructions still further cause the apparatus to transmit, to the network node on the PUCCH, the multiplexed first HARQ-ACK part and second HARQ-ACK part.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 6 is a flow diagram illustrating an example of a process for multiplexing a two part HARQ-ACK payload, in accordance with various aspects of the present disclosure.

FIG. 7 is a flow diagram illustrating an example of a process for multiplexing a two part HARQ-ACK payload, in accordance with various aspects of the present disclosure.

DETAILED DESCRIPTION

Figure 1:
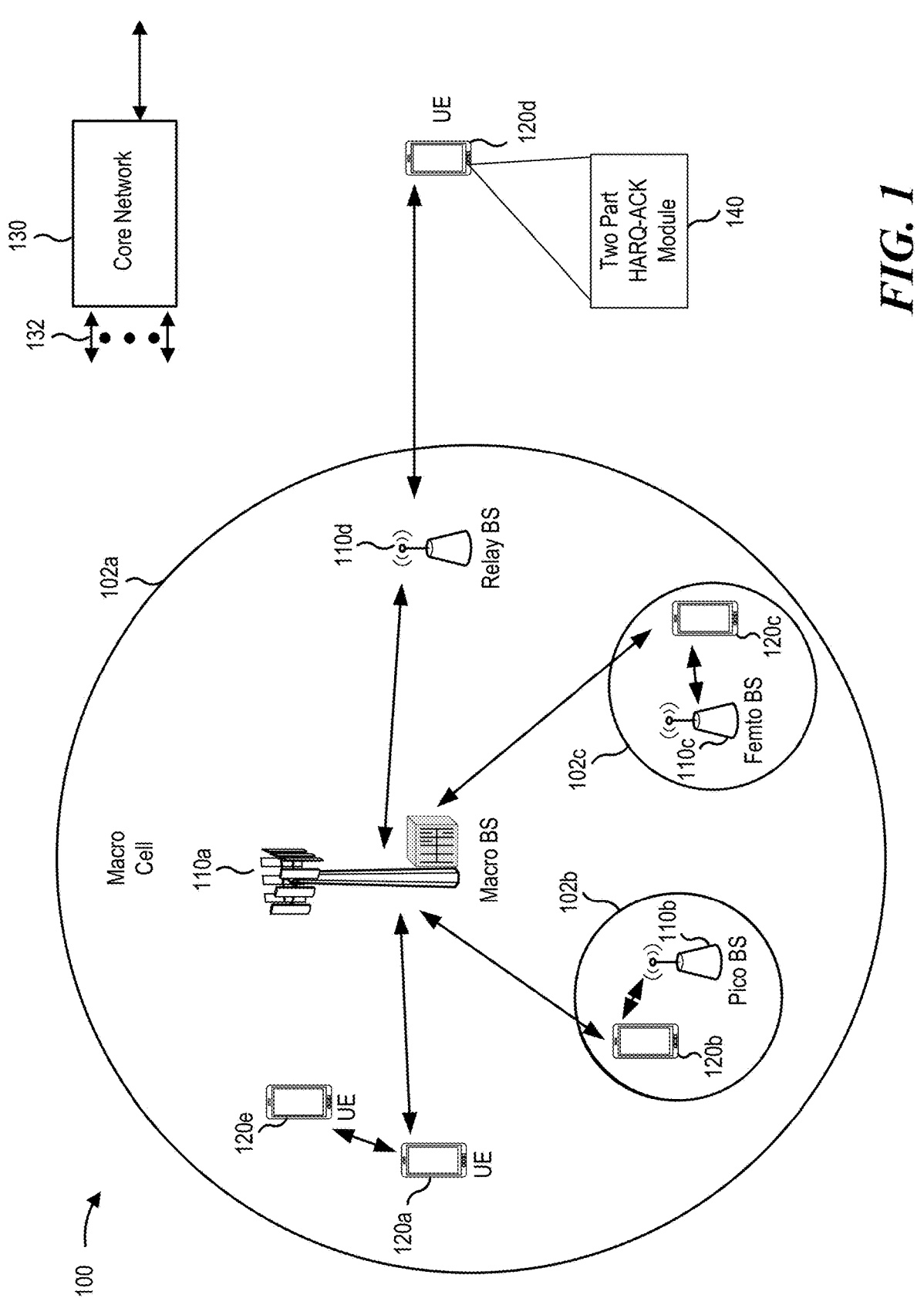
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communications may be unreliable at times. Techniques, such as hybrid automatic repeat request (HARQ), may help recover transmission errors by allowing a receiver to indicate to a transmitter whether a data transmission, such as a code block (CB), a code block group (CBG), or a transport block (TB), has been correctly decoded. The receiver may send an acknowledgement (ACK) in response to correctly decoding the transmission and may send a negative acknowledgement (NACK) in response to failing to decode the transmission. The transmitter may retransmit the transmission in response to receiving a NACK, such that the receiver may correctly decode the retransmission. In some cases, multiple retransmissions may occur. The resources for hybrid automatic repeat request acknowledgment (HARQ-ACK) feedback, which may be carried in a physical uplink control channel (PUCCH) or physical uplink shared channel (PUSCH), are significant. It would be desirable to reduce the number of bits allocated for HARQ-ACK feedback in the PUCCH.

Lossless compression for HARQ-ACK feedback provides a significant overhead reduction compared to standard HARQ-ACK feedback. Close to optimal compression or entropy can be obtained with two part or two stage HARQ-ACK compression. One or two bits in the first part may be generally sufficient. In the simplest form of lossless compression, the first part (e.g., part 1) of the two part HARQ-ACK payload has one bit. In some examples, the transmitter sets the single bit to '1' if all received code blocks are successfully decoded (e.g., all ACK). In such examples, nothing is sent for the second part of the two part HARQ-ACK payload (e.g., part 2). Otherwise, in such examples, the transmitter sets the single bit in the first part to '0', and sends the full payload in the second part of the two part HARQ-ACK payload.

Various aspects of the present disclosure are directed to forming a two part HARQ-ACK payload from an original HARQ-ACK payload. In some examples, the first HARQ-ACK part may be formed based on a fixed rule. In other examples, the first HARQ-ACK part may be formed in accordance with signaling received from a network node. In various implementations, a size of second HARQ-ACK part may be a function of the first HARQ-ACK part. In some examples, a transmitter may form the two part HARQ-ACK payload in accordance with receiving signaling from the network node. Additionally, or alternatively, the transmitter may indicate, to the network node, its capability to form the two part HARQ-ACK payload from the original HARQ-ACK payload. In some examples, separate beta offset values may be specified for multiplexing the two HARQ-ACK parts on a same physical uplink shared channel (PUSCH) or different PUSCHs. In other examples, different maximum code rates may be specified for multiplexing the two HARQ-ACK parts on a physical uplink control channel (PUCCH).

Particular aspects of the subject matter described in this disclosure can be implemented to realize one or more of the following potential advantages. In some examples, the described techniques, such as forming a two part HARQ-ACK payload from an initial HARQ-ACK payload may reduce a size of a HARQ-ACK transmission, thereby reducing network bandwidth.

FIG. 1 is a diagram illustrating a wireless network 100 in which aspects of the present disclosure may be practiced. The wireless network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by user equipment (UEs) with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a two part HARQ-ACK module 140. For brevity, only one UE 120d is shown as including the two part HARQ-ACK module 140. The two part HARQ-ACK module 140 may perform one or more operations, such as one or more operations discussed with reference to the processes 600 and 700 described with reference to FIGS. 6 and 7.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
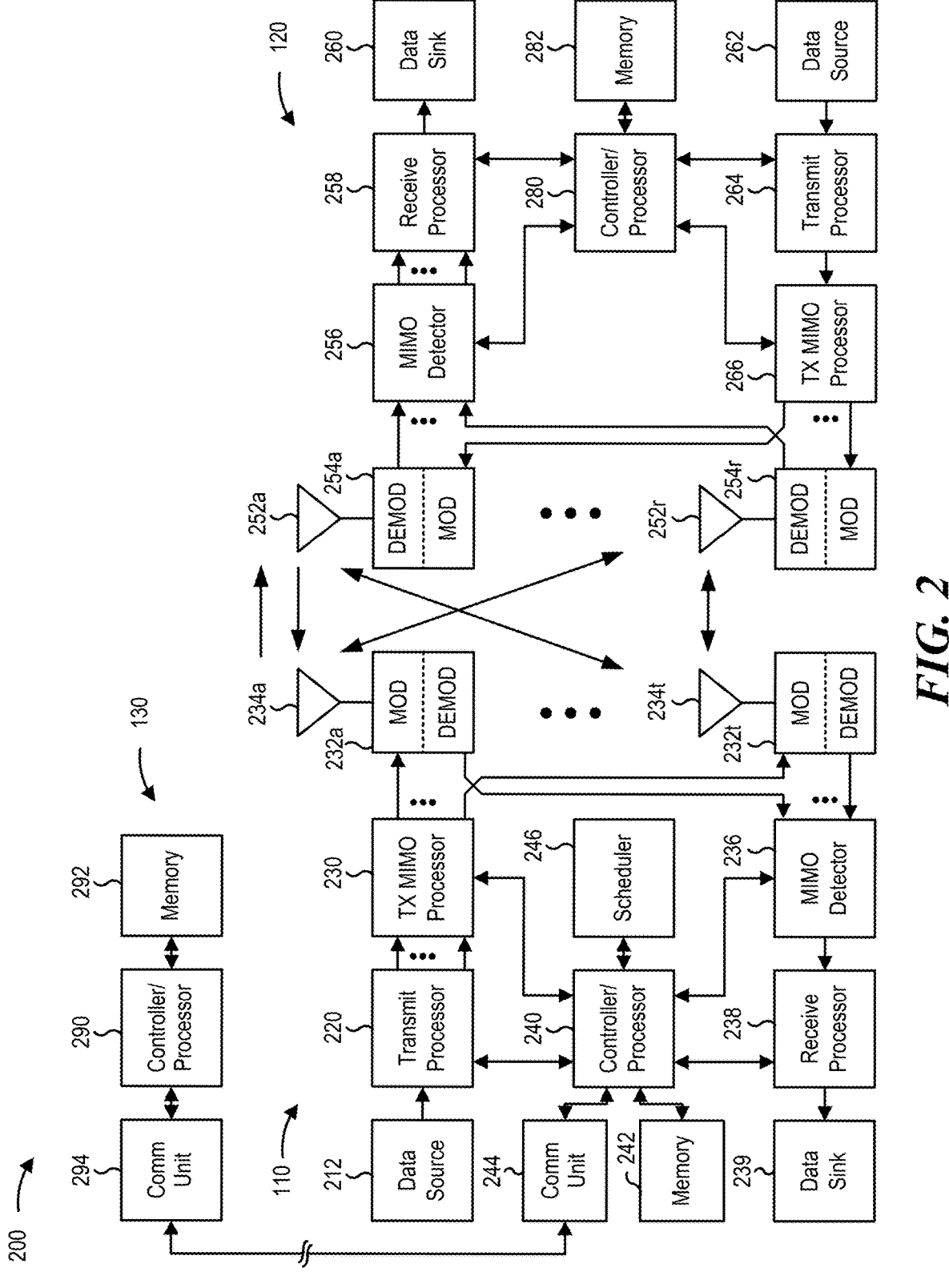
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with forming a two part HARQ-ACK payload, as described in more detail elsewhere. For example, the controller/processor 240 of the base station 110, the controller/processor 280 of the UE 120, and/or any other component(s) of FIG. 2 may perform or direct operations of, for example, the processes 600 and 700 of FIGS. 6 and 7 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for performing one or more operations, such as one or more operations discussed with reference to the processes 600 and 700 described with reference to FIGS. 6 and 7. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
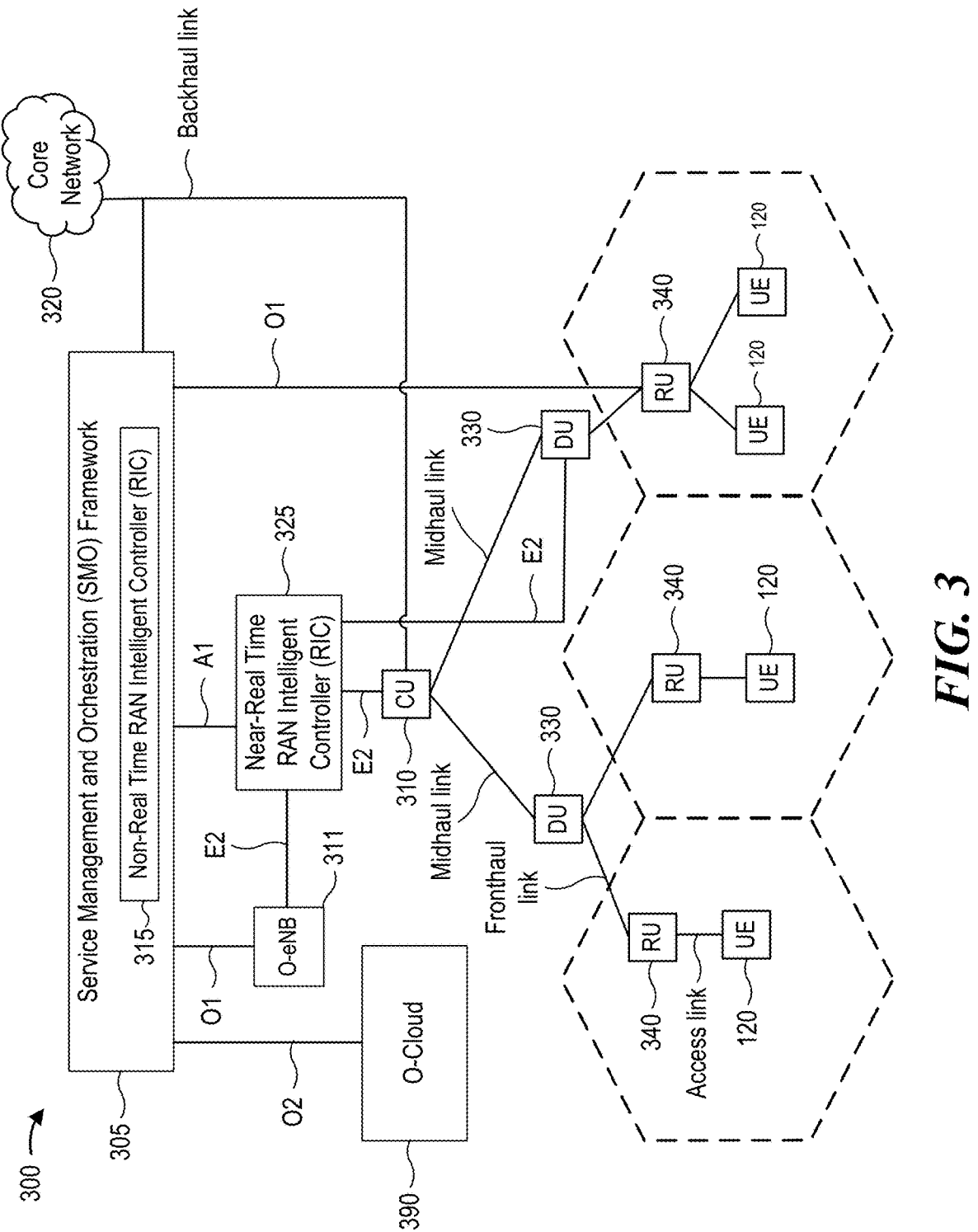
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration.

The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

In some cases, uplink control information (UCI) may be multiplexed on a PUSCH. In such cases, the multiplexing process may begin with a UE determining a number of resource elements (REs) in the PUSCH for UCI transmission. The number of REs (which is equal to the number of coded modulation symbols per layer) may indicate a number of bits available for rate matching and encoding. The UCI may then be encoded, rate-matched, and modulated. Following this, the modulated symbols of UCI may be mapped onto some of the REs of the PUSCH. The RE mapping is based on a set of rules that take into account various factors, such as a type of UCI, a location of PUSCH demodulation reference signals (DMRSs), and/or other factors. The described process may be performed with each UCI that overlaps with the PUSCH. For example, the process may be used for HARQ-ACK, channel state information (CSI) part 1, and CSI part 2. A same modulation order and number of layers used for PUSCH may be applied to UCI. The modulation order and the number of layers may be indicated in downlink control information (DCI) that schedules the PUSCH.

In some examples, a number of coded modulation symbols per layer $Q'$ (e.g., a number of REs for UCI) may be determined for each UCI. The number of coded modulation symbols per layer $Q'$ may be a function of a HARQ-ACK payload size ($O_{ACK}+L_{ACK}$), a beta offset $$\left(\beta_{offset}^{PUSCH}\right)$$

controlling the spectral efficiency ratio of PUSCH to UCI, a total number of PUSCH REs $$\left(\sum_{l=0}^{N_{symbol,all}^{PUSCH}-1} M_{sc}^{UCI}(l)\right),$$

a number of information bits for an uplink shared channel $$\left(\sum_{r=0}^{C_{UL-SCH}-1} K_r\right)$$

(e.g., an amount of uplink (UL) data), a scaling factor (a) for limiting a number of REs assigned to UCI on PUSCH, and/or a maximum number of REs that may be used for UCI $$\left(\alpha \cdot \sum_{l=l_0}^{N_{symbol,all}^{PUSCH}-1} M_{sc}^{UCI}(l)\right).$$

Different equations may be used for determining the number of coded modulation symbols Q' per layer based on whether the UCI is HARQ-ACK, CSI part 1, or CSI part 2, as well as whether the PUSCH includes uplink (UL) data. The beta offset may be semi-statically configured via RRC signaling or dynamically indicated in the UL DCI that schedules the PUSCH. One list of beta offset values may be configured, via RRC signaling, for the semi-static beta offset, and up to four lists of beta offset values may be configured, via RRC signaling, for the dynamic beta offset. In the case of the dynamic beta offset, two bits in the UL DCI may indicate which list should be used. Each list may include seven beta offset values: three for HARQ-ACK (UCI bits<=2, 2<UCI bits<=11, 11<UCI bits), two for CSI part 1, and two for CSI part 2 (2<UCI bits<=11, 11<UCI bits). An index between 0 and 31 is mapped to an actual value based on tables (separate for HARQ-ACK and CSI).

In some cases, when a physical uplink control channel (PUCCH) does not overlap a PUSCH, the UCI is not multiplexed on the PUSCH. Rather, the UCI is transmitted on the PUCCH. In such cases, a number of REs allocated for UCI transmission is based on a total number of PUCCH REs available in the PUCCH resource, excluding the demodulation reference signals (DMRSs). In some cases, a PUCCH resource may be configured with PUCCH Format 2 (PF2) or PUCCH Format 3 (PF3). In such cases, a parameter for a number of physical resource blocks (nrofPRBs) may configure the PUSCH resource to have more than one resource block (RB), such that the PUCCH resource may occupy multiple RBs. An actual number of RBs $$\left(M_{RB,min}^{PUCCH}\right)$$

for the UCI transmission may be based on a UCI payload size and a max code rate r configured for the PUCCH format, such that the actual number of RBs is equal to or less than the parameter (nrofPRBs) and also sufficient to accommodate the payload. A PUCCH resource configured with other PUCCH formats can occupy one RB only.

For HARQ-ACK transmissions, a UE may be configured, via RRC signaling, with up to four PUCCH resource sets. Each PUCCH resource set may include multiple PUCCH resources. The HARQ-ACK may be transmitted on the PUCCH in response to detecting one or more DCIs. A PUCCH resource indicator (PRI) field within a most recently detected DCI designates a specific PUCCH resource within one of the PUCCH resource sets. The UE may select a PUCCH resource set, from the configured PUCCH resource sets, based on a size of the HARQ-ACK payload. After identifying the appropriate PUCCH resource set, the UE may then identify the specific PUCCH resource to use for the HARQ-ACK transmission, as indicated by the PRI.

Wireless communications may be unreliable at times. Techniques, such as hybrid automatic repeat request (HARQ), may help recover transmission errors by allowing a receiver to indicate to a transmitter whether a code block has been correctly decoded. The receiver may send an acknowledgement (ACK) in response to correctly decoding the code block and may send a negative acknowledgement (NACK) in response to not being able to decode the code block. The transmitter may retransmit the code block in response to receiving a NACK, with the hope that the code block may be correctly decoded during the retransmission. In some cases, multiple retransmissions may occur. The resources for hybrid automatic repeat request acknowledgment (HARQ-ACK) feedback, which may be carried in a physical uplink control channel (PUCCH), are significant. It would be desirable to reduce the number of bits (e.g., payload size) in the PUCCH for carrying HARQ-ACK feedback.

The PUCCH has a variety of different formats in the fifth generation (5G) Third Generation Partnership Project (3GPP) specifications. Some PUCCH formats carry more than two bits, and some formats allow multiplexing. Format 0 defines a one or two symbol short PUCCH for up to two bits, with UE multiplexing in the same physical resource block (PRB). Format 1 defines a four to fourteen symbol long PUCCH for up to two bits, with UE multiplexing in the same PRB. Format 2 defines a one or two symbol short PUCCH for more than two bits, with no UE multiplexing in the same PRB. Format 3 defines a four to fourteen symbol long PUCCH for more than two bits, with no UE multiplexing in the same PRB. Format 4 defines a four to fourteen symbol long PUCCH for more than two bits, with UE multiplexing in the same PRB.

Three types of HARQ-ACK codebooks (e.g., HARQ-ACK payloads) are defined in 5G 3GPP specifications, where a codebook is represented as a sequence of bits. The type-1 HARQ-ACK codebook is a semi-static codebook. The type-2 HARQ-ACK codebook is a dynamic codebook. The type-3 HARQ-ACK codebook is for one shot feedback.

For downlink (DL) transmission, a target block error rate (BLER) may be set at around ten percent. Thus, a large portion of the HARQ feedback will be positive acknowledgement (e.g., ACK), as opposed to negative acknowledgement (NACK). Based on this assumption, the number of HARQ-ACK bits in the feedback can be reduced.

Figure 4:
FIG. 4 is a call flow diagram illustrating an example of two part hybrid automatic repeat request acknowledgement (HARQ-ACK) transmission, in accordance with various aspects of the present disclosure.
Figure 4:
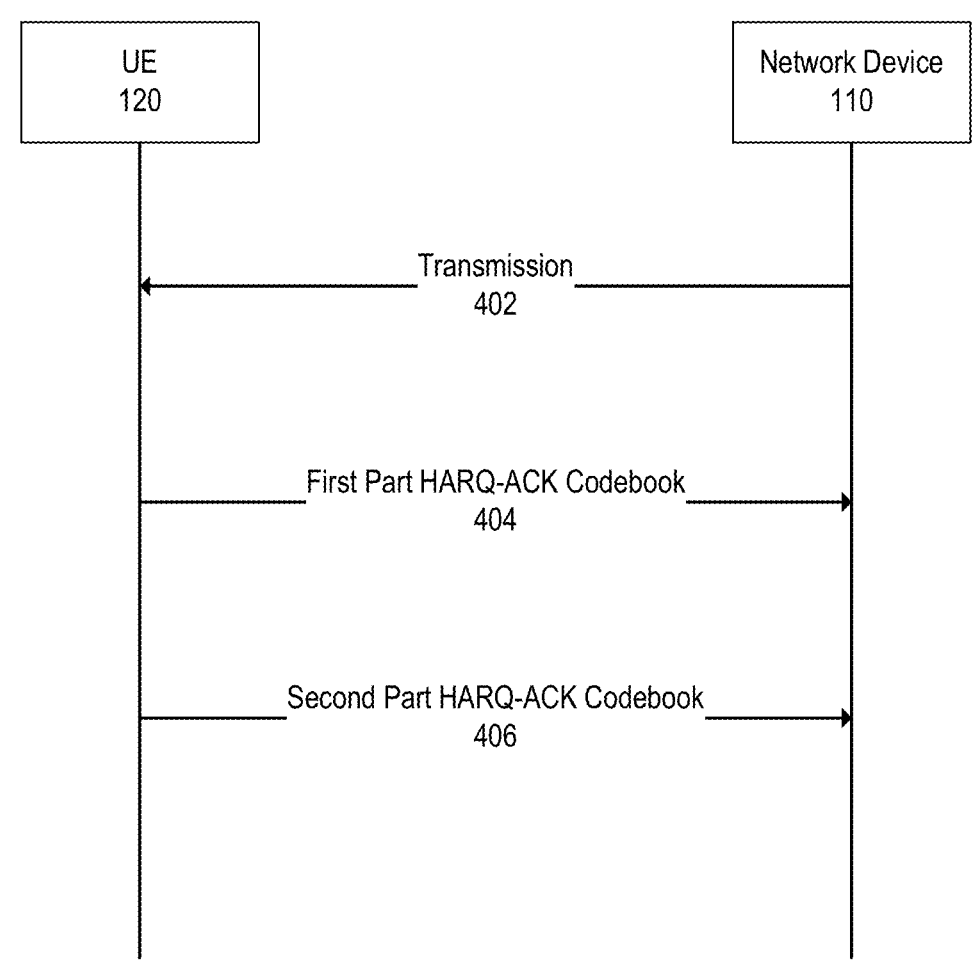

According to aspects of the present disclosure, lossless compression for HARQ-ACK feedback may be provided. FIG. 4 is a call flow diagram illustrating an example of two part hybrid automatic repeat request acknowledgement (HARQ-ACK) transmission, in accordance with various aspects of the present disclosure. In the example of FIG. 4, a UE 120 receives one or more transmissions from a network device 110, such as a base station, at time 402. The transmission may include multiple code blocks, transport blocks (TBs) or code block groups (CBGs). The UE 120 transmits HARQ feedback, via a HARQ-ACK payload, depending on whether the UE 120 successfully decodes the transmission, at time 402. It is noted that different ACK/NACK bits corresponding to the HARQ-ACK payload may correspond to different physical downlink shared channels (PDSCHs) (scheduled at different slots/sub-slots or on different component carriers/serving cells), or may correspond to different TBs (each PDSCH may contain one or two TBs), or may correspond to different CBGs (each TB may contain multiple CBGs), or may correspond to different CBs (each TB or each CBG may contain multiple CBs).

In the example of FIG. 4, the UE 120 communicates a first HARQ-ACK part (e.g., first part of a HARQ-ACK codebook) to a network device 110, at time 404. In some examples, the first part may include a single bit indicating whether all HARQ feedback is ACK. In some such examples, the first part indicates that at least one bit of the multi-bit HARQ-ACK feedback is a NACK (e.g., first part bit=0), then the UE 120 transmits a second part HARQ-ACK to the network device 110, at time 406.

In the example of FIG. 4, the two HARQ-ACK parts may be separately encoded. In some examples, the network device 110 decodes the first HARQ-ACK part before decoding the second HARQ-ACK part. The first HARQ-ACK part may have a fixed size. Additionally, a size and interpretation of the second HARQ-ACK part may be a function of a codepoint (e.g., payload) of the first HARQ-ACK part.

Figure 5:
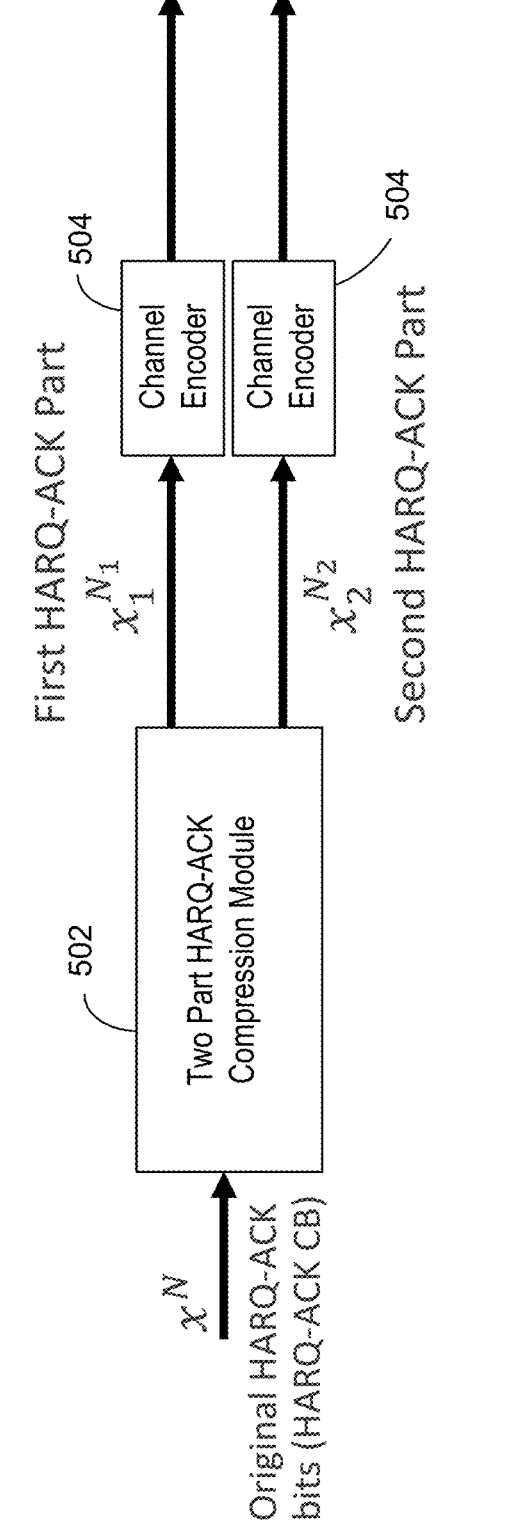
FIG. 5 is a block diagram illustrating an example of forming two HARQ-ACK parts based on an initial HARQ-ACK payload, in accordance with various aspects of the present disclosure.

FIG. 5 is a block diagram illustrating an example 500 of forming two HARQ-ACK parts based on an initial HARQ-ACK payload, in accordance with various aspects of the present disclosure. In the example of FIG. 5, a transmitter, such as a UE, may generate an initial HARQ-ACK payload (e.g., original HARQ-ACK payload) in accordance with receiving a set of downlink transmissions from a network node. The UE may be an example of a UE 120 described with reference to FIGS. 1-4, and the network node may be an example of a base station 110 or network device 110 described with reference to FIGS. 1-4. In some examples, the UE may transmit, to the network node, a message indicating whether it supports forming two HARQ-ACK parts based on an original HARQ-ACK payload.

As shown in FIG. 5, an original HARQ-ACK payload $x^N$ (e.g., HARQ-ACK codebook (CB)) may be processed by a two part HARQ-ACK compression module 502 to form a first HARQ-ACK part $$x_1^{N_1}$$

and a second HARQ-ACK part $$x_2^{N_2}.$$

Each HARQ-ACK part $$x_1^{N_1} \text{ and } x_2^{N_2}$$

may be separately encoded by a channel encoder 504 and then transmitted to a receiver, such as the network node. The channel encoders 504 may be the same or different channel encoders. In some examples, a size of an original HARQ-ACK payload (e.g., initial HARQ-ACK payload) may be N bits. The N bits may also be referred to as a HARQ-ACK payload size. In such examples, a size of the first HARQ-ACK part may be $N_1$ bits, and a size of the second HARQ-ACK part may be $N_2$ bits. In some examples, a first size $N_1$ is fixed. In some examples, the first size $N_1$ may be a function of a size N of the original HARQ-ACK payload. That is, the first size $N_1$ may be fixed for a given size N of the original HARQ-ACK payload. Additionally, a second size $N_2$ may be variable and may be a function of the first size $N_1$. The two part HARQ-ACK may provide error-free compressions. For example, given the first HARQ-ACK part $$x_1^{N_1}$$

and the second HARQ-ACK part $$x_2^{N_2},$$

the receiver may determine the original HARQ-ACK payload $x^N$. Specifically, the network node may decode the first HARQ-ACK part $$x_1^{N_1},$$

determine a second size $N_2$ based on decoding the first HARQ-ACK part $$x_1^{N_1},$$

decode the second HARQ-ACK part $$x_2^{N_2},$$

and then determine the original HARQ-ACK payload $x^N$ based on the first HARQ-ACK part $$x_1^{N_1}$$

and the second HARQ-ACK part $$x_2^{N_2}$$

In some examples, the UE may determine the first HARQ-ACK part $$x_1^{N_1}$$

and the second HARQ-ACK part $$x_2^{N_2}$$

based on a first fixed rule. In such examples, if the original HARQ-ACK payload $x^N$ is all ACKs (e.g., all N bits of the original HARQ-ACK payload $x^N$ are ACKs), the first HARQ-ACK part $$x_1^{N_1}$$

indicates one and the second HARQ-ACK part

$$x_2^{N_2}$$

is empty. In this example, the first size $N_1$ is one and the second size $N_2$ is zero. Additionally, in such examples, if the original HARQ-ACK payload $x^N$ includes one or more NACKs, the first HARQ-ACK part $$x_1^{N_1}$$

indicates zero and the second HARQ-ACK part $$x_2^{N_2}$$

indicates the original HARQ-ACK payload $x^N$, such that the second size $N_2$ is equal to a size N of the original HARQ-ACK payload $x^N$. In these examples, the first HARQ-ACK part $$x_1^{N_1}$$

is a binary AND operation across all N bits of the original HARQ-ACK payload $x^N$.

In other examples, the first HARQ-ACK part $$x_1^{N_1}$$

and the second HARQ-ACK part $$x_2^{N_2}$$

may be determined based on a second fixed rule. In such examples, if the original HARQ-ACK payload $x^N$ is all ACKs or all NACKs, the first HARQ-ACK part $$x_1^{N_1}$$

indicates one, the first size $N_1$ is one, and the second size $N_2$ is one. In such examples, if the original HARQ-ACK payload $x^N$ is all ACKs, the second HARQ-ACK part $$x_2^{N_2}$$

indicates one. Alternatively, if the original HARQ-ACK payload $x^N$ is all NACKs, the second HARQ-ACK part $$x_2^{N_2}$$

indicates zero. Additionally, in such examples, if the original HARQ-ACK payload $x^N$ includes one or more NACKs and one or more ACKs, the first HARQ-ACK part $$x_1^{N_1}$$

indicates zero and the second HARQ-ACK part $$x_2^{N_2}$$

indicates the original HARQ-ACK payload $x^N$, such that the second size $N_2$ is equal to a size N of the original HARQ-ACK payload $x^N$.

In some other examples, for each possible HARQ-ACK payload size N, the UE receives partitioning information from the network node. For example, the network node may transmit an RRC message indicating the partitioning information. Each possible HARQ-ACK payload size N may be associated with $2^N$ codepoints. For example, a payload size of two may be associated with four codepoints (00, 01, 10, and 11). In such examples, the network node may partition the $2^N$ codepoints into $2^{N_1}$ groups, where each group g $(1 \leq g \leq 2^{N_1})$ includes one or more members, where a parameter $m_g$ indicates the number of members in a group g. The parameter g represents a group index. The first HARQ-ACK part $$x_1^{N_1}$$

may have a fixed size and the second HARQ-ACK part $$x_2^{N_2}$$

may have a variable length based on a number of members $m_g$ in a group g. For example, a second size $N_2$ of the second HARQ-ACK part $$x_2^{N_2}$$

may be equal to $\lceil \log_2 m_g \rceil$ bits, where $\lceil \log_2 m_g \rceil$ represents a ceiling function. That is, the first HARQ-ACK part $$x_1^{N_1}$$

indicates a group index, and the second HARQ-ACK part $$x_2^{N_2}$$

indicates a member of the group associated with the group index indicated by the first HARQ-ACK part. As a result, a codepoint (payload) of the original HARQ-ACK payload can be uniquely determined based on the first HARQ-ACK part and the second HARQ-ACK part. Hence, the receiver can determine the codepoint (payload) associated with the original HARQ-ACK codebook based on the first HARQ-ACK part and the second HARQ-ACK part.

In some examples, for each payload size N, the network node transmits a message indicating a group index g for each codepoint of the set of $2^N$ codepoints. For example, if the payload size N is five, there may be thirty-two codepoints ($2^5$). For ease of explanation, the first size $N_1$ may equal two, such that there are four groups ($2^2$). In this example, the network node indicates a group index g for each of the thirty-two codepoints. For example, the network node may indicate that codepoint 11111 is associated with group one, codepoints 11110 and 111101 are associated with group two, codepoints 11011 to 11100 are associated with group three, and codepoints 11010 to 00000 are associated with group four. In this example, the first HARQ-ACK part $$x_1^{N_1}$$

may indicate 00 for group one, 01 for group two, 10 for group three, and 11 for group four. The second size $N_2$ of the second HARQ-ACK part $$x_2^{N_2}$$

may be equal to $\lceil \log_2 m_g \rceil$ bits. For example, for group one, the second size $N_2$ may be zero because group one only has one member (e.g., $\lceil \log_2 1 \rceil = 0$). As another example, for group two, the second size $N_2$ may be one because group two has two members (e.g., $\lceil \log_2 2 \rceil = 1$). In this example, the second HARQ-ACK part $$x_2^{N_2}$$

may indicate zero to indicate a first member (11110) of group two and one to indicate a second member (11101) of group two. Aspects of the present disclosure are not limited to the aforementioned example, other codepoint values may be associated with each group index g. In some such examples, a value of the first size $N_1$ or the number of groups $2^{N_1}$ may be pre-defined. In other examples, a value of the first size $N_1$ or the number of groups $2^{N_1}$ may be based on one or more possible values based on the payload size N.

In some other examples, for each payload size N, the network node transmits a message indicating $2^{N_1}$ lists, where each list corresponds to a group index g and includes the respective $m_g$ members (e.g., $m_g$ codepoints) associated with the group index g. For example, if the payload size N is five, there may be thirty-two codepoints ($2^5$). For ease of explanation, $N_1$ may equal two, such that there are four groups ($2^2$). In this example, the network node indicates four lists. For example, a first list indicates that group one includes codepoint 11111, a second list indicates that group two includes codepoints 11110 and 111101, a third list indicates that group three includes codepoints 11011 to 11100, and a fourth list indicates that group four includes codepoints 11010 to 00000. In this example, the first list includes one member, the second list includes two members, the third list includes four members, and the fourth list includes twenty-five members. As an example, if the codepoint (e.g., HARQ-ACK payload) is 11010, the first HARQ-ACK part $$x_1^{N_1}$$

indicates 11 corresponding to group four and the second HARQ-ACK part $$x_2^{N_2}$$

may indicate 00000 corresponding to the first member of the fourth group. Aspects of the present disclosure are not limited to the aforementioned example, other codepoint values may be associated with the lists.

Additionally, the number of lists may be equal to or less than the number of groups. For example, the network node may indicate lists associated with three of the four groups, and the UE may deduce the members of the fourth group. In some such examples, a value of the first size $N_1$ or the number of groups $2^{N_1}$ may be pre-defined. In other examples, a value of the first size $N_1$ or the number of groups $2^{N_1}$ may be based on one or more possible values based on the payload size N.

In some other examples, both the UE and the network node assume a same ordering across the $2^N$ codepoints. For example, the ordering may be based on an ordering described in TABLE 1. For each payload size N, the network node transmits a message indicating a number of members $m_g$ for each of the $2^{N_1}-1$ groups. The number of members $m_g$ may be indicated by a parameter $p_g$, in which $p_g = \log_2 my$ assuming that the number of members $m_g$ in all groups (expect the last group) is a power of two (e.g., $m_g = 2^{p_g}$). In such examples, the UE may deduce the members of a group that is not included in the $2^{N_1}-1$ groups, based on the members $m_g$ of each of the $2^{N_1}-1$ groups.

As an example, based on the example of TABLE 1, if the payload size N is five, there may be thirty-two codepoints ($2^5$). For ease of explanation, $N_1$ may equal two, such that there are four groups ($2^2$). In this example, the network node indicates group one includes one member, group two includes two members, and group three includes four members. Alternatively, the network node may indicate $2^{N_1}-1$ values corresponding to the last member in the ordered list for the first $2^{N_1}-1$ groups. For example, based on TABLE 1, the network node may indicate 11111 corresponding to the last member of group one, 11101 corresponding to the last member of group two, and 11100 corresponding to the last member of group three. As another alternative, the network node may indicate a first member in the ordered list (TABLE 1) for the last $2^{N_1}-1$ groups. For example, based on TABLE 1, the network node may indicate 11110 corresponding to the first member of group two, 11011 corresponding to the first member of group three, and 11010 corresponding to the first member of group four. In some such examples, a value of the first size $N_1$ or the number of groups $2^{N_1}$ may be pre-defined. In other examples, a value of the first size $N_1$ or the number of groups $2^{N_1}$ may be based on one or more possible values based on the payload size N.

In TABLE 1, the parameter $x^N$ represents a codepoint, the parameter $p(x^N)$ represents a probability of a codepoint, the parameter $$g/x_1^{N_1}$$

represents a group index g and a value of a first HARQ-ACK part $$x_1^{N_1},$$

the parameter $$x_2^{N_2}$$

represents a value of a second HARQ-ACK part, and $N_1+N_2$ represents a sum of the first size $N_1$ and the second size $N_2$ (e.g., a total number of bits associated with the first HARQ-ACK part and the second HARQ-ACK part).

TABLE 1

| $x^N$ | $p(x^N)$ | $g/x_1^{N_1}$ | $x_2^{N_2}$ | $N_1 + N_2$ |
|---|---|---|---|---|
| 11111 | 0.59049 | 1/00 | Ø | 2 |
| 11110 | 0.06561 | 2/01 | 0 | 3 |
| 11101 | 0.06561 | 2/01 | 1 | 3 |
| 11011 | 0.06561 | 3/10 | 00 | 4 |
| 10111 | 0.06561 | 3/10 | 01 | 4 |
| 01111 | 0.06561 | 3/10 | 10 | 4 |
| 11100 | 0.00729 | 3/10 | 11 | 4 |
| 11010 | 0.00729 | 4/11 | 00000 | 7 |
| 11011 | 0.00729 | 4/11 | 00001 | 7 |
| . . . | . . . | . . . | . . . | . . . |
| 00000 | 1e−05 | 4/11 | 11000 | 7 |

In some examples, the values in the ordered list (e.g., TABLE 1) may be based on a probability of occurrence ($p(x^N)$) for the $2^N$ codepoints. In other examples, to ensure both the UE and network node assume the same ordering, the $2^N$ codepoints may be ordered based on the number of ACKs ("1") in each codepoint. Codepoints having a same number of ACKs may be ordered based on a decimal representation of the binary sequence corresponding to the respective codepoints.

In other examples, for each payload size N, the network node may indicate the first size $N_1$ or a number of groups $2^{N_1}$ for a given codepoint. In such examples, the partitioning may be based on a rule associated with a value of the first size $N_1$. Additionally, in such examples, both the UE and the network node assume a same ordering across the $2^N$ codepoints, such as the ordering in TABLE 1. In some implementations, if a value of the first size $N_1$ is one, group one includes a first codepoint (e.g., 11111) and the second group includes the remaining $2^N-1$ members. Alternatively, if a value of the first size $N_1$ is two, group one includes the first codepoint (e.g., 11111), group two includes the next two codepoints (e.g., 11110 and 11101), group three includes the next four codepoints, the fourth group includes the remaining codepoints. In general, the i'th group includes $2^{i-1}$ members, and the last group of the $2^{N_1}$ groups includes the remaining groups $$\left(\text{e.g., } 2^N - \sum_{i=1}^{2^{N_1}-1} 2^{i-1} = 2^N - \left(2^{\left(2^{N_1}-1\right)} - 1\right)\right).$$

In some such examples, a value of the first size $N_1$ or the number of groups $2^{N_1}$ may be based on one or more possible values corresponding to the payload size N.

In some examples, if a group of partition schemes is specified, such as two or more of the partitioning schemes discussed above, the network node may enable one of the partitioning schemes via control signaling, such as an RRC message. Additionally, or alternatively, the UE may indicate support for one or more partitioning schemes via UE capability signaling.

In some examples, the UE may receive, from the network node, a message enabling the UE to form the first HARQ-ACK part and the second HARQ-ACK part. In such examples, the message is one of a radio resource control (RRC) message, a medium access control (MAC)-control element (CE) message, or downlink control information (DCI). The RRC message may semi-statically enable the UE to form the first HARQ-ACK part and the second HARQ-ACK part per PUCCH group. The MAC-CE message may enable the UE to form the HARQ-ACK parts, for a given PUCCH group, and the UE forms each HARQ-ACK part after a MAC-CE application time (e.g., three milliseconds (3 ms) after a HARQ-ACK associated with the PDSCH that carries the MAC-CE message).

The DCI may be a downlink DCI message that schedules a PDSCH or indicates a PUCCH resource for HARQ-ACK transmission. Alternatively, the DCI may be an uplink DCI message that schedules a PUSCH. In other examples, the DCI may be a group-common DCI format. The DCI may include a field, such as a one-bit field, that indicates whether to enable forming the two HARQ-ACK parts. The presence of the field may be RRC-configured per DCI format. For example, among DCI formats 1_1/1_2/0_1/0_2, some DCI formats may be configured to include this field, while other DCI formats may not include this field.

As discussed, various parameters for the various aspects of the present disclosure may be RRC configuration. In some examples, one or more parameters may be indicated by a MAC-CE message or DCI. For example, the choice between the first size $N_1$ having a value of one (1-bit first HARQ-ACK part) or a value of two (2-bits first HARQ-ACK part) may be dynamically indicated by the MAC-CE message or DCI. Additionally, the various parameters described for the various aspects of the present disclosure may be configured per physical layer priority.

As discussed, in some cases, when using a fixed partitioning scheme, a compression ratio for a HARQ-ACK payload may decrease as a size N of the HARQ-ACK payload increases. Various aspects of the present disclosure are directed to increasing a HARQ-ACK payload compression ratio while using a fixed partitioning scheme for larger HARQ-ACK payload sizes N, such as a HARQ-ACK payload with a size N that is greater than a size threshold. In some examples, the HARQ-ACK payload may be segmented into a group of segments (e.g., blocks) prior to forming a first HARQ-ACK part and a second HARQ-ACK part.

As discussed, in some examples, the first HARQ-ACK part and the second HARQ-ACK part may be multiplexed onto a same channel. The first HARQ-ACK part and the second HARQ-ACK part may be referred to as uplink control information (UCI). For example, the first HARQ-ACK part and the second HARQ-ACK part may be multiplexed on a same physical uplink shared channel (PUSCH) when a physical uplink control channel (PUCCH) associated with an original HARQ-ACK payload overlaps the PUSCH associated with the multiplexed UCI. In some examples, a UE or network node may only support multiplexing the first HARQ-ACK part and the second HARQ-ACK part on the same PUSCH. In such examples, if the PUCCH does not overlap with any PUSCH, the original HARQ-ACK payload may be transmitted directly on the PUCCH without transforming the original HARQ-ACK payload into two parts. Alternatively, the original HARQ-ACK payload may be transformed, and only the first HARQ-ACK part is transmitted. That is, the second HARQ-ACK part may be omitted. In other examples, if the PUCCH overlaps the PUSCH, the UE multiplexes both HARQ-ACK parts on the PUSCH, rather than transmitting the original HARQ-ACK payload. In other examples, if the PUSCH is scheduled by DCI, the DCI may indicate whether the two part HARQ-ACK should be multiplexed on the PUSCH or whether the original HARQ-ACK payload should be multiplexed on the PUSCH.

In some examples, the first HARQ-ACK part may puncture PUSCH data resource elements (REs), particularly when the first HARQ-ACK part is one bit or two bits. The first HARQ-ACK part may not puncture PUSCH data REs if the first HARQ-ACK part is jointly encoded with other UCI. Depending on a size of the second HARQ-ACK part, the second HARQ-ACK part may either puncture PUSCH data REs or undergo rate matching. In some examples, the second HARQ-ACK part may be rate matched if it satisfies a rate matching condition. For example, the rate matching condition may be satisfied if the second HARQ-ACK part size is greater than a threshold. As another example, the rate matching condition may be satisfied if the second HARQ-ACK part size is less than a threshold. In other examples, the second HARQ-ACK part may be rate matched irrespective of its size.

In some examples, other UCIs, such as a configured grant (CG)-UCI (CG-UCI) or channel state information (CSI), may also be transmitted on the PUSCH. In some such examples, the CG-UCI may be jointly encoded with either the first HARQ-ACK part or the second HARQ-ACK part. In another example, if the CSI only has one part, the CSI may be separately encoded and then multiplexed onto the PUSCH, resulting in the multiplexing of three distinct UCIs (e.g., the CSI, the first HARQ-ACK part, and the second HARQ-ACK part).

In some examples, the CSI may have two parts, in which both part-one CSI and part-two CSI are separately encoded. Current wireless standards only allow up to three different UCI types to be multiplexed on the PUSCH. Therefore, various strategies may be used to multiplex a two part CSI with both HARQ-ACK parts.

In some examples, the part-two CSI may be ignored, such that only the first HARQ-ACK part, the second HARQ-ACK part, and part-one CSI are multiplexed on the PUSCH. In other examples, both HARQ-ACK parts and both CSI parts are separately encoded and multiplexed on the same PUSCH. In other examples, the first HARQ-ACK part may be encoded with the part-one CSI, and the second HARQ-ACK part may be encoded with the part-two CSI. This results in two jointly encoded UCIs being multiplexed on the PUSCH. Alternatively, other examples may use a hybrid approach, in which the first HARQ-ACK part may be jointly encoded with the part-one CSI and subsequently multiplexed with the individual encodings of the second HARQ-ACK part and the part-two CSI.

In other examples, the second HARQ-ACK part may be jointly encoded with the part-two CSI. This joint encoding may be multiplexed on the PUSCH with the individual encodings of the first HARQ-ACK part and the part-one CSI. In still other examples, the second HARQ-ACK part may be jointly encoded with the part-one CSI, after which the individual encodings of the first HARQ-ACK part and the part-two CSI may be multiplexed with the joint encoding of the second HARQ-ACK part with part-one CSI on the PUSCH.

Other examples may simplify the process, such that, rather than splitting the HARQ-ACK into two parts, the entire HARQ-ACK payload is transmitted and then multiplexed alongside the part-one and part-two CSI on the PUSCH. Lastly, in other examples, the transmission of the second HARQ-ACK part and/or the second CSI part may be delayed, making it possible to shift the delayed transmission to a subsequent PUCCH/PUSCH transmission scenario.

In some examples, a PUCCH (e.g., PUCCH resource) designated for transmitting an original HARQ-ACK payload may not overlap with a PUSCH (e.g., PUSCH resource). In such examples, the first HARQ-ACK part may be transmitted on the PUCCH, while the second HARQ-ACK part may be multiplexed onto a PUSCH, such as a subsequent PUSCH. This multiplexing scheme may present complexities when there is a delay in transmitting the second HARQ-ACK part, particularly if there is no overlap between the PUCCH and a PUSCH.

As discussed, each HARQ-ACK part may be separately encoded. Therefore, multiplexing and transmitting each HARQ-ACK part may face unique challenges, because decoding the first HARQ-ACK part is a prerequisite to decoding the second HARQ-ACK part. In conventional systems, a size of part two CSI is dependent on a payload of a part one CSI, therefore, the CSI parts are independently encoded. In such systems, a UE may be configured with different beta offset values for multiplexing the part one CSI and the part two CSI on the PUSCH. This separate configuration is based on the independent encoding process. To determine a minimum number of RBs for a PUCCH resource, the UE may assume a maximum payload size for the part two CSI. Alternatively, the UE may assume a payload size for the part two CSI to identify a PUCCH resource within a PUCCH resource set. This assumption is based on a potential size of the part two CSI, which is contingent on the payload of the part one CSI, for example, when the part one CSI indicates a rank of one.

Various aspects of the present disclosure are directed to determining a beta offset for multiplexing a two-part HARQ-ACK on a same PUSCH or different PUSCHs. Some other aspects are directed to determining maximum code rates for multiplexing the two-part HARQ-ACK on the same PUCCH.

In some examples, a UE may be configured with separate beta offset values $$\left( \beta_{offset}^{HARQ-ACK,Part1} \quad \beta_{offset}^{HARQ-ACK,Part2} \right)$$

for multiplexing a first HARQ-ACK part and a second HARQ-ACK part on a same or different PUSCHs. Each beta offset value may be an index, ranging from 0 to 31, that corresponds to specific rows in a predefined table that may identify an actual value of the beta offset.

As discussed, the HARQ-ACK parts may be multiplexed together on a single PUSCH or across different PUSCHs. In either case, the UE uses the beta offset values to determine a quantity of PUSCH REs ($Q_{ACK,Part1}'$ and/or $Q_{ACK,Part2}'$) allocated for UCI multiplexing. If both parts are multiplexed on the same PUSCH, the UE first computes the REs ($Q_{ACK,Part1}'$) for the first HARQ-ACK part based on $$\beta_{offset}^{HARQ-ACK,Part1}$$

(e.g., a first beta offset), and subsequently, the UE calculates the REs ($Q_{ACK,Part2}'$) for the second HARQ-ACK part based on $$\beta_{offset}^{HARQ-ACK,Part2}$$

(e.g., a second beta offset). The number of REs ($Q_{ACK,Part2}'$) for the second HARQ-ACK part is not only a function of the second beta offset. Additionally, the number of REs ($Q_{ACK,Part2}'$) may also be a function of the number of REs ($Q_{ACK,Part1}'$) for the first HARQ-ACK part, as this affects a number of available REs for the second HARQ-ACK part. In some examples, if the CSI is also multiplexed on the PUSCH, the UE determines a number of REs for multiplexing the CSI on the PUSCH. The number of REs for the CSI may be a function of the REs ($Q_{ACK,Part1}'$ and $Q_{ACK,Part2}'$) assigned to both HARQ-ACK parts based on their impact on a remaining number of REs available for the CSI.

Furthermore, the configurations for each beta offset $$\left(\beta_{offset}^{HARQ-ACK,Part1} \text{ or } \beta_{offset}^{HARQ-ACK,Part2}\right)$$

may include multiple values directed to different payload lengths, given that the coding scheme is contingent on a payload length (e.g., payload size). For example, three separate values may be specified for each beta offset to accommodate scenarios where the UE multiplexes up to 2 bits, more than 2 bits and less than 11 bits, or more than 11 bits for the information payload for either the first HARQ-ACK part or the second HARQ-ACK part.

Each beta offset may be semi-statically or dynamically configured. For a semi-static beta offset configuration, an RRC message configures one list for each beta offset $$\left(\beta_{offset}^{HARQ-ACK,Part1} \text{ and } \beta_{offset}^{HARQ-ACK,Part2}\right)$$

associated with the first and second HARQ-ACK parts. The UE then selects the appropriate value from the list based on the HARQ-ACK payload size the UE needs to transmit. For a dynamic beta offset, the RRC configures multiple lists, potentially two or four, for each beta offset $$\left(\beta_{offset}^{HARQ-ACK,Part1} \text{ and } \beta_{offset}^{HARQ-ACK,Part2}\right)$$

associated with the first and second HARQ-ACK parts. The DCI that schedules the PUSCH transmission specifies which list the UE should refer to. For example, one or two bits in the DCI may indicate a specific list. The UE then selects the specific value from the specified list that aligns with the HARQ-ACK payload size. TABLE 2 is an example of selecting a beta offset value from a list corresponding to a beta offset indicator included in the DCI.

TABLE 2

| Beta offset indicator in DCL | $\beta_{offset}^{HARQ-ACK,Part1}$ | $\beta_{offset}^{HARQ-ACK,Part2}$ |
|---|---|---|
| 00 | One value within the first RRC-configured list for Part 1 HARQ-ACK is selected based on Part 1 HARQ-ACK payload size | One value within the first RRC-configured list for Part 2 HARQ-ACK is selected based on Part 2 HARQ-ACK payload size |
| 01 | One value within the second RRC-configured list for Part 1 HARQ-ACK is selected based on Part 1 HARQ-ACK payload size | One value within the second RRC-configured list for Part 2 HARQ-ACK is selected based on Part 2 HARQ-ACK payload size |
| 10 | One value within the third RRC-configured list for Part 1 HARQ-ACK is selected based on Part 1 HARQ-ACK payload size | One value within the third RRC-configured list for Part 2 HARQ-ACK is selected based on Part 2 HARQ-ACK payload size |
| 11 | One value within the fourth RRC-configured list for Part 1 HARQ-ACK is selected based on Part 1 HARQ-ACK payload size | One value within the fourth RRC-configured list for Part 2 HARQ-ACK is selected based on Part 2 HARQ-ACK payload size |

In some cases, a PUCCH does not overlap a PUSCH, therefore, the UE may multiplex both HARQ-ACK parts on a same PUCCH resource. In such cases, if the PUCCH resource (e.g. PUCCH resource designated for either format 2 or 3) is allocated for more than one RB $$\left(\text{e.g., } M_{RB}^{PUCCH} > 1 \ RBs\right),$$

the UE determines a minimum number of RBs $$\left(M_{RB,min}^{PUCCH} \le M_{RB}^{PUCCH}\right)$$

for the PUCCH resource based on an assumption of a maximum payload size of the second HARQ-ACK part, regardless of an actual payload size of the second HARQ-ACK part. For example, the actual payload size of the second HARQ-ACK part may be less than the assumed maximum payload size. The calculation of the maximum payload size assumes that each of the HARQ-ACK bits indicates a NACK, or assuming the first HARQ-ACK part indicates all zeroes. That is, a payload size of the second HARQ-ACK part is maximized if the original HARQ-ACK CB (before converting to two parts) consists of all NACKs. The network node (e.g., base station) is unaware of a size of the second HARQ-ACK part before decoding the first HARQ-ACK part. Therefore, the number of RBs allocated for the PUCCH resource cannot be a function of the actual payload size of the second HARQ-ACK part.

In some examples, the UE is configured with a single maximum coding rate (r) for the PUCCH resource. The UE uses this coding rate to determine the minimum number of RBs $$\left(M_{RB,min}^{PUCCH}\right),$$

for the HARQ-ACK transmission on the PUCCH, from a total number of available RBs $$\left( M_{RB}^{PUCCH} \right)$$

that satisfies the following condition:

$$N_1 + N_{2,max} \leq M_{RB,min}^{PUCCH} \cdot N_{sc,ctrl}^{RB} \cdot N_{symb-UCI}^{PUCCH} \cdot Q_m \cdot r. \qquad (1)$$

In Equation 1, $N_1$ represents a payload size (e.g., number of bits), including cyclic redundancy check (CRC) bits, allocated to a first HARQ-ACK part, $N_{2,max}$ represents a maximum payload size, including CRC bits, for a second HARQ-ACK part, and $$N_{sc,ctrl}^{RB} \cdot N_{symb-UCI}^{PUCCI} \cdot Q_m$$

represents a number of coded bits available for UCI, excluding the demodulation reference signal (DMRS). That is, the UE ensures that the combined bit count of both HARQ-ACK parts does not exceed the number of coded bits that can be transmitted on the PUCCH resource, given the constraints of the modulation and coding scheme.

In some other examples, two values of maximum code rate $r_1$ and $r_2$ may correspond to the first HARQ-ACK part and the second HARQ-ACK part, respectively, for the PUCCH resource. In such examples, the UE determines a number of RBs $$\left( M_{RB,min}^{PUCCH} \right),$$

for the HARQ-ACK transmission on the PUCCH, from a total number of available RBs $$\left( M_{RB}^{PUCCH} \right)$$

that satisfies one of the following conditions:

$$\frac{N_1}{r_1} + \frac{N_{2,max}}{r_2} \leq M_{RB,min}^{PUCCH} \cdot N_{sc,ctrl}^{RB} \cdot N_{symb-UCI}^{PUCCH} \cdot Q_m, \text{ or} \qquad (2)$$

$$N_1 r_2 + N_{2,max} r_1 \leq M_{RB,min}^{PUCCH} \cdot N_{sc,ctrl}^{RB} \cdot N_{symb-UCI}^{PUCCH} \cdot Q_m \cdot r_1 r_2 \qquad (3)$$

In some examples, a minimum number of RBs $$\left( M_{RB,min}^{PUCCH} \right)$$

for the HARQ-ACK transmission on the PUCCH resource exceeds a total number of available RBs $$\left( M_{RB}^{PUCCH} \right)$$

configured for the PUCCH resource (hence, UE determines that $$M_{RB,min}^{PUCCH} = M_{RB}^{PUCCH}$$

as a result of not being able to use more RBs than the configured number of RBs). In such examples, the UE may proceed to transmit the PUCCH on the total number of available RBs $$\left( M_{RB}^{PUCCH} \right).$$

In some such examples, the UE may also transmit both the first and second HARQ-ACK parts. This may lead to a situation where the actual code rate used is higher than a maximum allowed code rate when at least a size of the second HARQ-ACK part is large. The actual code rate is based on a total number of transmitted bits. In other examples, the UE may only transmit the first HARQ-ACK part and omits the second HARQ-ACK part. In other examples, if an actual payload size of the second HARQ-ACK part is less than a threshold, such that transmitting the second HARQ-ACK part would not cause the code rate to exceed the maximum limit, the UE transmits both HARQ-ACK parts. If transmitting the HARQ-ACK part exceeds the maximum code rate, the UE only transmits the first HARQ-ACK part and forgoes the second HARQ-ACK part.

In some examples, the UE multiplexes the first and second HARQ-ACK parts on a PUCCH resource specified by the PRI field of DCI. In such examples, the UE assumes a maximum payload size for a second HARQ-ACK part to determine a total payload size of the two HARQ-ACK parts $(N_1+N_2)$. The payload size of the two HARQ-ACK parts is used to select a PUCCH resource set from which the PRI selects a PUCCH resource. Specifically, the UE first determines a HARQ-ACK payload size for the first of the two HARQ-ACK parts $(N_1+N_2)$ assuming a maximum payload size $(N_{2,max})$ for the second HARQ-ACK part. The UE then selects a PUCCH resource set among the configured PUCCH resource sets based on the HARQ-ACK payload size $(N_1+N_{2,max})$. The UE then identifies a PUCCH resource from the selected PUCCH resource set based on the PRI. After identifying a PUCCH resource, the UE transmits the actual payload of the HARQ-ACK parts $(N_1+N_2)$ on the PUCCH resource. As discussed above, the calculation of the maximum payload size assumes that each of the HARQ-ACK bits indicates a NACK, or assumes the first HARQ-ACK part indicates all zeroes. Additionally, the actual payload size of the second HARQ-ACK part may be less than the assumed maximum payload size.

Although the preceding description refers to HARQ-ACK. Any other type of ACK is also contemplated.

FIG. 6 is a flow diagram illustrating an example of a process 600 for multiplexing a two part HARQ-ACK payload, in accordance with various aspects of the present disclosure. The operations of the process 600 may be implemented by a UE, such as a UE 120 described with reference to FIGS. 1-4. As shown in the example of FIG. 7, the process 600 begins at block 602 by receiving, from a network node, a group of downlink transmissions. At block 604, the process 600 forms a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. At block 606, the process 600 separately encodes the first HARQ-ACK part and the second HARQ-ACK part. At block 608, the process 600 multiplexes the encoded first HARQ-ACK part in accordance with a first beta offset value and the encoded second HARQ-ACK part in accordance with a second beta offset value. At block 610, the process 600 transmits, to the network node, the multiplexed first HARQ-ACK part and second HARQ-ACK part.

FIG. 7 is a flow diagram illustrating an example of a process 700 for multiplexing a two part HARQ-ACK payload, in accordance with various aspects of the present disclosure. The operations of the process 700 may be implemented by a UE, such as a UE 120 described with reference to FIGS. 1-4. As shown in the example of FIG. 7, the process 700 begins at block 702 by receiving, from a network node, a group of downlink transmissions. At block 704, the process 700 forms a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part. At block 706, the process 700 separately encodes the first HARQ-ACK part and the second HARQ-ACK part. At block 708, the process 700 selectively multiplexes, on a PUCCH, the encoded first HARQ-ACK part and the encoded second HARQ-ACK part based on a maximum payload size of the second HARQ-ACK part. At block 710, the process 700 transmits, to the network node on the PUCCH, the multiplexed first HARQ-ACK part and second HARQ-ACK part.

Example Aspects

Implementation examples are described in the following numbered clauses:

Clause 1. A method for wireless communication at a user equipment (UE), comprising: receiving, from a network node, a group of downlink transmissions; forming a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part; separately encoding the first HARQ-ACK part and the second HARQ-ACK part; multiplexing the encoded first HARQ-ACK part in accordance with a first beta offset value and the encoded second HARQ-ACK part in accordance with a second beta offset value; and transmitting, to the network node, the multiplexed first HARQ-ACK part and second HARQ-ACK part.

Clause 2. The method of Clause 1, wherein the first beta offset value indicates a first number of resource elements allocated to the encoded first HARQ-ACK part and the second beta offset value indicates a second number of resource elements allocated to the encoded second HARQ-ACK part.

Clause 3. The method of any one of Clauses 1-2, wherein the encoded first HARQ-ACK part and the encoded second HARQ-ACK part are multiplexed on a single PUSCH or different PUSCHs.

Clause 4. The method of Clause 3, further comprising: determining a first number of resource elements, for multiplexing the encoded first HARQ-ACK part on the single PUSCH, based on the first beta offset value; and determining a second number of resource elements, for multiplexing the encoded first HARQ-ACK part on the single PUSCH, based on the second beta offset value, wherein the second number of resource elements are determined after determining the first number of resource elements.

Clause 5. The method of Clause 4, wherein the second number of resource elements is further based on the first number of resource elements.

Clause 6. The method of any one of Clauses 1-5, further comprising receiving a radio resource control (RRC) message indicating a first set of beta offset values and a second set of beta offset values, wherein: the first beta offset value is one of the first set of beta offset values based on a first payload size of the first HARQ-ACK part; and the second beta offset value is one of the second set of beta offset values based on a second payload size of the second HARQ-ACK part.

Clause 7. The method of any one of Clauses 1-5, further comprising: receiving a radio resource control (RRC) message indicating a first group of sets of beta offset values and a second group of sets of beta offset values; receiving a downlink control information (DCI) message indicating a first set of beta offset values from the first group of sets of beta offset values and a second set of beta offset values from the second group of sets of beta offset values, wherein: the first beta offset value is one of the first set of beta offset values based on a first payload size of the first HARQ-ACK part; and the second beta offset value is one of the second set of beta offset values based on a second payload size of the second HARQ-ACK part.

Clause 8. The method of Clause 7, wherein the DCI message includes a one bit field or a two bit field that indicates the first set of beta offset values and the second set of beta offset values.

Clause 9. A method for wireless communication at a user equipment (UE), comprising: receiving, from a network node, a group of downlink transmissions; forming a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part; separately encoding the first HARQ-ACK part and the second HARQ-ACK part; selectively multiplexing, on a PUCCH, the encoded first HARQ-ACK part and the encoded second HARQ-ACK part based on a maximum payload size of the second HARQ-ACK part; and transmitting, to the network node on the PUCCH, the multiplexed first HARQ-ACK part and second HARQ-ACK part.

Clause 10. The method of Clause 9, wherein the maximum payload size is different than an actual payload size of the second HARQ-ACK part.

Clause 11. The method of any one of Clauses 9-10, wherein the maximum payload size is based on a first payload size in which each HARQ-ACK bit of the HARQ-ACK payload indicates a negative acknowledgement (NACK) or a second payload size in which a payload of the first HARQ-ACK part is all zeros.

Clause 12. The method of any one of Clauses 9-11, further comprising determining a minimum number of resource blocks for transmitting the multiplexed first HARQ-ACK part and second HARQ-ACK part on the PUCCH based on the maximum payload size.

Clause 13. The method of Clause 12, wherein a function of a maximum code rate, the minimum number of resource blocks, and a number of coded bits available for uplink control information (UCI), is greater than or equal to a sum of an actual payload size of the first HARQ-ACK part and the maximum payload size.

Clause 14. The method of Clause 12, wherein the minimum number of resource blocks is greater than or equal to a function of a first maximum code rate, a second maximum code rate, an actual payload size of the first HARQ-ACK part, and the maximum payload size.

Clause 15. The method of Clause 12, wherein only the first HARQ-ACK part is multiplexed on the PUCCH based on a total number of resource blocks allocated for the PUCCH being less than the minimum number of resource blocks.

Clause 16. The method of Clause 12, wherein only the first HARQ-ACK part is multiplexed on the PUCCH based on: a total number of resource blocks allocated for the PUCCH being less than the minimum number of resource blocks; and an actual payload size of the second HARQ-ACK part being greater than a payload threshold.

Clause 17. The method of any one of Clauses 9-16, further comprising: receiving a radio resource control message (RRC) message indicating a group of PUCCH resource sets; determining a PUCCH resource set from the group of PUCCH resource sets based on a sum of an actual payload of the first HARQ-ACK part and the maximum payload; and selecting resources associated with the PUCCH from the PUCCH resource set based on a PUCCH resource indicator (PRI) included in a downlink control information (DCI) message that schedules the PUCCH.

Clause 18. An apparatus comprising one or more processors, one or more memories coupled with the one or more processors, and instructions stored in the one or more memories and operable, when executed by the one or more processors to cause the apparatus to perform any one of Clauses 1 through 8.

Clause 19. An apparatus comprising at least one means for performing any one of Clauses 1 through 8.

Clause 20. A computer program comprising code for causing an apparatus to perform any one of Clauses 9 through 17.

Clause 21. An apparatus comprising one or more processors, one or more memories coupled with the one or more processors, and instructions stored in the one or more memories and operable, when executed by the one or more processors to cause the apparatus to perform any one of Clauses 9 through 17.

Clause 22. An apparatus comprising at least one means for performing any one of Clauses 1 through 8.

Clause 23. A computer program comprising code for causing an apparatus to perform any one of Clauses 9 through 17.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication at a user equipment (UE), comprising:

receiving, from a network node, a group of downlink transmissions;

forming a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part;

separately encoding the first HARQ-ACK part and the second HARQ-ACK part;

multiplexing the encoded first HARQ-ACK part in accordance with a first beta offset value and the encoded second HARQ-ACK part in accordance with a second beta offset value; and transmitting, to the network node, the multiplexed first HARQ-ACK part and second HARQ-ACK part.

2. The method of claim 1, wherein the first beta offset value indicates a first number of resource elements allocated to the encoded first HARQ-ACK part and the second beta offset value indicates a second number of resource elements allocated to the encoded second HARQ-ACK part.

3. The method of claim 1, wherein the encoded first HARQ-ACK part and the encoded second HARQ-ACK part are multiplexed on a single PUSCH or different PUSCHs.

4. The method of claim 3, further comprising:

determining a first number of resource elements, for multiplexing the encoded first HARQ-ACK part on the single PUSCH, based on the first beta offset value; and determining a second number of resource elements, for multiplexing the encoded first HARQ-ACK part on the single PUSCH, based on the second beta offset value, wherein the second number of resource elements are determined after determining the first number of resource elements.

5. The method of claim 4, wherein the second number of resource elements is further based on the first number of resource elements.

6. The method of claim 1, further comprising receiving a radio resource control (RRC) message indicating a first set of beta offset values and a second set of beta offset values, wherein:

the first beta offset value is one of the first set of beta offset values based on a first payload size of the first HARQ-ACK part; and the second beta offset value is one of the second set of beta offset values based on a second payload size of the second HARQ-ACK part.

7. The method of claim 1, further comprising:

receiving a radio resource control (RRC) message indicating a first group of sets of beta offset values and a second group of sets of beta offset values; and receiving a downlink control information (DCI) message indicating a first set of beta offset values from the first group of sets of beta offset values and a second set of beta offset values from the second group of sets of beta offset values, wherein:

the first beta offset value is one of the first set of beta offset values based on a first payload size of the first HARQ-ACK part; and the second beta offset value is one of the second set of beta offset values based on a second payload size of the second HARQ-ACK part.

8. The method of claim 7, wherein the DCI message includes a one bit field or a two bit field that indicates the first set of beta offset values and the second set of beta offset values.

9. An apparatus for wireless communications at a user equipment (UE), comprising:

one or more processors; and one or more memories coupled with the one or more processors and storing instructions operable, when executed by the one or more processors, to cause the apparatus to:

receive, from a network node, a group of downlink transmissions;

form a first hybrid automatic repeat request acknowledgement (HARQ-ACK) part and a second HARQ- ACK part associated with a HARQ-ACK payload, the HARQ-ACK payload including HARQ feedback for each one of the group of downlink transmissions, a size of the second HARQ-ACK part being a function of the first HARQ-ACK part;

separately encode the first HARQ-ACK part and the second HARQ-ACK part;

multiplex the encoded first HARQ-ACK part in accordance with a first beta offset value and the encoded second HARQ-ACK part in accordance with a second beta offset value; and transmit, to the network node, the multiplexed first HARQ-ACK part and second HARQ-ACK part.

10. The apparatus of claim 9, wherein the first beta offset value indicates a first number of resource elements allocated to the encoded first HARQ-ACK part and the second beta offset value indicates a second number of resource elements allocated to the encoded second HARQ-ACK part.

11. The apparatus of claim 9, wherein the encoded first HARQ-ACK part and the encoded second HARQ-ACK part are multiplexed on a single PUSCH or different PUSCHs.

12. The apparatus of claim 11, wherein execution of the instructions further cause the apparatus to:

determine a first number of resource elements, for multiplexing the encoded first HARQ-ACK part on the single PUSCH, based on the first beta offset value; and determine a second number of resource elements, for multiplexing the encoded first HARQ-ACK part on the single PUSCH, based on the second beta offset value, wherein the second number of resource elements are determined after determining the first number of resource elements.

13. The apparatus of claim 12, wherein the second number of resource elements is further based on the first number of resource elements.

14. The apparatus of claim 9, wherein:

execution of the instructions further cause the apparatus to receive a radio resource control (RRC) message indicating a first set of beta offset values and a second set of beta offset values;

the first beta offset value is one of the first set of beta offset values based on a first payload size of the first HARQ-ACK part; and the second beta offset value is one of the second set of beta offset values based on a second payload size of the second HARQ-ACK part.

15. The apparatus of claim 9, wherein:

execution of the instructions further cause the apparatus to:

receive a radio resource control (RRC) message indicating a first group of sets of beta offset values and a second group of sets of beta offset values; and receive a downlink control information (DCI) message indicating a first set of beta offset values from the first group of sets of beta offset values and a second set of beta offset values from the second group of sets of beta offset values;

the first beta offset value is one of the first set of beta offset values based on a first payload size of the first HARQ-ACK part; and the second beta offset value is one of the second set of beta offset values based on a second payload size of the second HARQ-ACK part.

16. A method for wireless communication at a user equipment (UE), comprising:

receiving, from a network node, a group of downlink transmissions;

forming a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part;

separately encoding the first HARQ-ACK part and the second HARQ-ACK part;

selectively multiplexing, on a PUCCH, the encoded first HARQ-ACK part and the encoded second HARQ-ACK part based on a maximum payload size of the second HARQ-ACK part; and transmitting, to the network node on the PUCCH, the multiplexed first HARQ-ACK part and second HARQ-ACK part.

17. The method of claim 16, wherein the maximum payload size is different than an actual payload size of the second HARQ-ACK part.

18. The method of claim 16, wherein the maximum payload size is based on a first payload size in which each HARQ-ACK bit of the HARQ-ACK payload indicates a negative acknowledgement (NACK) or a second payload size in which a payload of the first HARQ-ACK part is all zeros.

19. The method of claim 16, further comprising determining a minimum number of resource blocks for transmitting the multiplexed first HARQ-ACK part and second HARQ-ACK part on the PUCCH based on the maximum payload size.

20. The method of claim 19, wherein a function of a maximum code rate, the minimum number of resource blocks, and a number of coded bits available for uplink control information (UCI), is greater than or equal to a sum of an actual payload size of the first HARQ-ACK part and the maximum payload size.

21. The method of claim 19, wherein the minimum number of resource blocks is greater than or equal to a function of a first maximum code rate, a second maximum code rate, an actual payload size of the first HARQ-ACK part, and the maximum payload size.

22. The method of claim 19, wherein only the first HARQ-ACK part is multiplexed on the PUCCH based on a total number of resource blocks allocated for the PUCCH being less than the minimum number of resource blocks.

23. The method of claim 19, wherein only the first HARQ-ACK part is multiplexed on the PUCCH based on:

a total number of resource blocks allocated for the PUCCH being less than the minimum number of resource blocks; and an actual payload size of the second HARQ-ACK part being greater than a payload threshold.

24. The method of claim 16, further comprising:

receiving a radio resource control message (RRC) message indicating a group of PUCCH resource sets;

determining a PUCCH resource set from the group of PUCCH resource sets based on a sum of an actual payload of the first HARQ-ACK part and the maximum payload; and selecting resources associated with the PUCCH from the PUCCH resource set based on a PUCCH resource indicator (PRI) included in a downlink control information (DCI) message that schedules the PUCCH.

25. An apparatus for wireless communications at a user equipment (UE), comprising:

one or more processors; and one or more memories coupled with the one or more processors and storing instructions operable, when executed by the one or more processors, to cause the apparatus to:

receive, from a network node, a group of downlink transmissions;

form a first hybrid automatic repeat request acknowledgement (HARQ-ACK) part and a second HARQ-ACK part associated with a HARQ-ACK payload, the HARQ-ACK payload including HARQ feedback for each one of the group of downlink transmissions, a size of the second HARQ-ACK part being a function of the first HARQ-ACK part;

separately encode the first HARQ-ACK part and the second HARQ-ACK part;

selectively multiplex, on a PUCCH, the encoded first HARQ-ACK part and the encoded second HARQ-ACK part based on a maximum payload size of the second HARQ-ACK part; and transmit, to the network node on the PUCCH, the multiplexed first HARQ-ACK part and second HARQ-ACK part.

26. The apparatus of claim 25, wherein the maximum payload size is different than an actual payload size of the second HARQ-ACK part.

27. The apparatus of claim 25, wherein the maximum payload size is based on a first payload size in which each HARQ-ACK bit of the HARQ-ACK payload indicates a negative acknowledgement (NACK) or a second payload size in which a payload of the first HARQ-ACK part is all zeros.

28. The apparatus of claim 25, wherein execution of the instructions further cause the apparatus to determine a minimum number of resource blocks for transmitting the multiplexed first HARQ-ACK part and second HARQ-ACK part on the PUCCH based on the maximum payload size.

29. The apparatus of claim 28, wherein a function of a maximum code rate, the minimum number of resource blocks, and a number of coded bits available for uplink control information (UCI), is greater than or equal to a sum of an actual payload size of the first HARQ-ACK part and the maximum payload size.

30. The apparatus of claim 28, wherein the minimum number of resource blocks is greater than or equal to a function of a first maximum code rate, a second maximum code rate, an actual payload size of the first HARQ-ACK part, and the maximum payload size.

* * * * *